United States Patent [19]

Kavehrad et al.

[11] Patent Number: 4,644,562
[45] Date of Patent: Feb. 17, 1987

[54] COMBINED CROSS POLARIZATION INTERFERENCE CANCELLATION AND INTERSYMBOL INTERFERENCE EQUALIZATION FOR TERRESTRIAL DIGITAL RADIO SYSTEMS

[75] Inventors: Mohsen Kavehrad, Holmdel; Jack Salz, Fair Haven, both of N.J.

[73] Assignees: AT&T Company; AT&T Bell Laboratories, both of Holmdel, N.J.

[21] Appl. No.: 770,174

[22] Filed: Aug. 28, 1985

[51] Int. Cl.$^4$ ............................................. H04B 1/12
[52] U.S. Cl. ...................................... 375/14; 375/15;
375/101; 455/295
[58] Field of Search ................ 455/60, 295, 303, 307;
364/724; 333/18; 343/361, 362; 375/14, 15, 39,
101, 103

[56] References Cited

U.S. PATENT DOCUMENTS

| | | | |
|---|---|---|---|
| 4,053,837 | 10/1977 | Ryan et al. | 333/18 |
| 4,181,888 | 1/1980 | Falconer | 375/15 |
| 4,321,705 | 3/1982 | Namiki | 455/295 |
| 4,367,555 | 1/1983 | Namiki et al. | 375/99 |
| 4,422,175 | 12/1983 | Bingham et al. | 375/14 |
| 4,438,530 | 3/1984 | Steinberger | 455/278 |
| 4,577,330 | 3/1986 | Kavehrad | 375/15 |
| 4,606,054 | 8/1986 | Amitay et al. | 455/60 |

OTHER PUBLICATIONS

"Adaptive Cross-Polarization Interference Cancellation for Dual-Polarized M-QAM Signals" by M. Kavehrad, *GlobeCom-83 Proceedings*, San Diego, Calif., Nov. 1983.

"Adaptive Decision Feedback Cancellation of Intersymbol Interference Over Multipath Fading Radio Channels, by M. Kavehrad, *1983 IEEE*, 83CH1874-7/83/000-0869, C8.5.1-C8.5.3, pp. 869-871.

*Primary Examiner*—Robert L. Griffin
*Assistant Examiner*—Raymond C. Glenny
*Attorney, Agent, or Firm*—Patrick E. Roberts; Robert O. Nimtz

[57] ABSTRACT

Data-aided equalization and cancellation in digital data transmission over dually polarized fading radio channels is disclosed. The present invention uses decision feedback structures with finite-tap transversal filters. Subject to the assumption that some past and/or future data symbols are correctly detected, formulas and algorithms for evaluating the least mean-square error for different structures are disclosed. In a sequence of curves, the performance of various structures for a particular propagation model and several fading events are evaluated and compared.

5 Claims, 11 Drawing Figures

OPTIMUM NORMALIZED MSE VS NUMBER OF CANCELER TAPS
FOR A 40dB CENTERED FADE OVER A 22MHz CHANNEL

OPTIMUM NORMALIZED MSE VS NUMBER OF CANCELER TAPS FOR A 20 dB CENTERED FADE OVER A 22 MHz CHANNEL

OPTIMUM NORMALIZED MSE VS NUMBER OF CANCELER TAPS FOR A 40 dB CENTERED FADE OVER A 22 MHz CHANNEL

OPTIMUM NORMALIZED MSE VS NUMBER OF CANCELER TAPS FOR A 40dB, 69% OFFSET FADE OVER A 22 MHz CHANNEL

OPTIMUM NORMALIZED MSE VS NUMBER OF CANCELER
TAPS FOR A 20dB CENTERED FADE OVER A 22MHz
AND A 40MHz CHANNEL

NORMALIZED $MSE_0$ VS FADE NOTCH OFFSET

SENSITIVITY TO TIMING PHASE FOR A 40dB FADE NOTCH,
OFFSET BY 34.5 PERCENT, OVER A 22 MHz CHANNEL

COMBINED CROSS POLARIZATION INTERFERENCE CANCELLATION AND INTERSYMBOL INTERFERENCE EQUALIZATION FOR TERRESTRIAL DIGITAL RADIO SYSTEMS

TECHNICAL FIELD

This invention relates to terrestrial digital radio systems and, in particular, to cross polarization cancellation and intersymbol interference equalization in said systems.

BACKGROUND OF THE INVENTION

Transmission of M-state quadrature amplitude modulated (QAM) signals via orthogonally polarized carriers results in the conveyance of increased information within a given bandwidth, resulting further in economic advantages. The main obstacle in the way of realizing these advantages is the unavoidable presence of cross polarization interference (CPI) between the dually polarized signals which arise due to factors such as multipath fading, antenna misalignments, and imperfect waveguide feeds.

The theory of linear and decision feedback equalization/cancellation, to mitigate the effects of intersymbol interference (ISI) and noise in the transmission of a single digital signal, is well established in an article entitled "Digital Communication over Fading Radio Channels," Bell System Technical Journal, Volume 62, Number 2, Part 1, pages 429 to 459, February 1983 by Messrs. G. J. Foschini and J. Salz. But a combination of data aided compensation of CPI cancellation and ISI equalization in the presence of noise in the aforesaid manner has not been solved heretofore.

SUMMARY OF THE INVENTION

In accordance with the illustrative embodiment of the present invention, the problem of cross polarization interference (CPI) cancellation and intersymbol interference (ISI) equalization is solved by using data aided decision feedback techniques. Most importantly, finite tap transversal structures which are implemented adaptively are used in a receiver. A window sample of the signal that is received is processed in two sections. The first section is equalized and the interference in the remaining section is canceled. Furthermore, the taps are not co-located. That is, the equalizer taps operate over a range where the canceler taps are not operative. Likewise, the canceler taps operate over the remaining range where the equalizer is not operative.

The receiver configuration is based on a matrix structure from the theory of optimal detection. The structure is optimal when the mean square error (MSE) of the received signal from the ideal signal is minimized. The optimal structure comprises a matrix matched filter in cascade with a transversal filter and an intersymbol interference and cross polarization interference canceler. The canceler uses detected data symbols to estimate the interference to be canceled. Data aided operations presume correct knowledge of detected data symbols.

A dually polarized channel is modeled by a particular four by four real matrix impulse response or its Fourier transform followed by additive noise. The two by two block diagonal elements of this matrix represent the co-polarized (in line) responses, while the off-diagonal two by two block entries represent cross coupled and cross polarized interfering responses. Each matrix channel characterizes a snapshot of a multipath fading event which in the present of noise limits the achievable error rate of the receiver for a given data rate.

For a reasonable co-polarized and cross polarized propagation model and a severe centered fade, 40 dB notch depth with a secondary ray delay of 6.3 ns, over an approximately 22 MHz channel bandwidth, the performance of transversal filters with a finite number of taps deployed in a decision feedback canceler structure is substantially (6 dB) better than linear equalization, and the difference can be up to 10 dB for offset fades. It can be shown that a 3 dB increase in MSE translates into about 1 bit/sec/Hz decrease in data rate efficiently at a fixed error rate or an order of magnitude increase in outage probability. Hence, linear equalization may not be adequate in deep fades.

Decision feedback/canceler structures achieve the ultimate matched filter bound with only nine matrix taps provided that error propagation is neglected.

Nine linear equalizer taps essentially achieve the performance of the infinite-tap linear equalizer. This method is, of course, free of error propagation.

For milder centered fades, 20 dB depth with a secondary ray delay of 6.3 ns, the linear equalizer configuration with nine taps is only 1 dB inferior to the decision feedback structure over a 22 MHz channel. If the channel bandwidth is increased to 40 MHz, however, the performance of the linear equalizer is worse than that of the decision feedback structure by 2.2 dB and the difference can be up to 3 dB for offset fades.

Decision feedback/canceler configurations are less sensitive to timing phase than linear structures.

DETAILED DESCRIPTION

Figure 1:
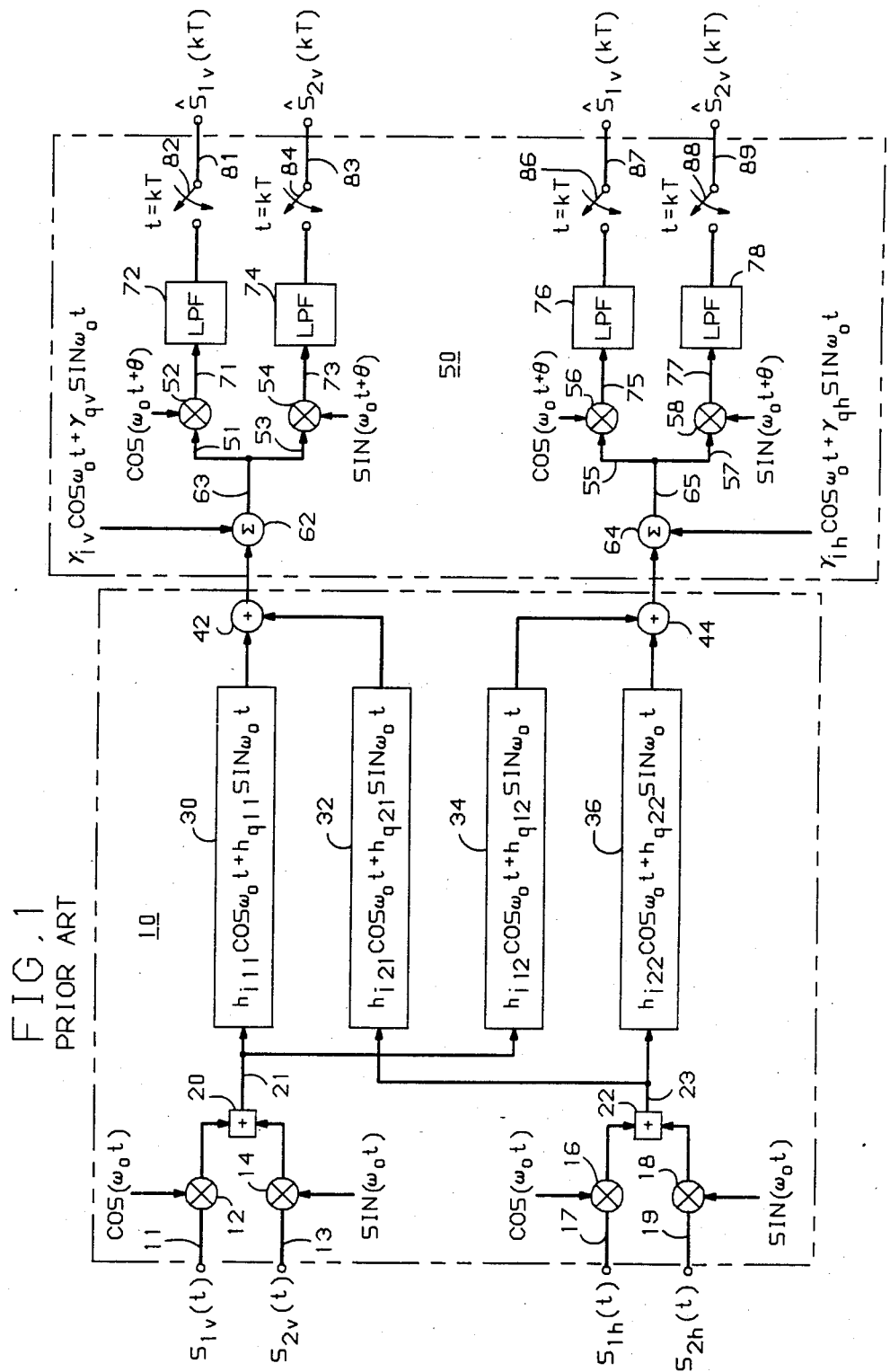
FIG. 1 shows a block diagram of a dual polarized system.

Referring to FIG. 1, there is shown a prior art transmission system which utilizes a dually polarized digital radio communication channel supporting two independent quadrature amplitude modulated (QAM) data signals. The system shows an ideal QAM modulator 10, that is transmitter, and demodulator 50, that is receiver. Four independent synchronous data signals $S_{1v}(t), S_{1h}(t)$, where $1 = 1, 2$ and which are represented generically as $$S_{1v}(t) = \sum_n a_{1vn} g(t - nT), \text{ where } 1 = 1, 2 \tag{1}$$

and $$S_{1h}(t) = \sum_n a_{1hn} g(t - nT), \text{ where } 1 = 1,2$$

amplitude modulate two linearly polarized carrier waves in quadrature at multipliers 12, 14, 16, and 18.

The vertically modulated signal, $$S_v(t) = S_{1v}(t) \cos \omega_0 t + S_{2v}(t) \sin \omega_0 t \tag{2}$$

is transmitted over the vertically polarized channel 21, while $$S_h(t) = S_{1h}(t) \cos \omega_0 t + S_{2h}(t) \sin \omega_0 t \quad (3)$$

the horizontally modulated signal, is transmitted over the horizontally polarized channel 23. The carrier frequency is $\omega_0$ and the real data symbols $$a_{1vn}, \; 1=1,2 \text{ and } a_{1hn}, \; 1=1, 2, \text{ where } -\infty < n < \infty$$

are assumed to be independently drawn from a lattice of points with odd integer coordinates. The QAM constellations associated with equations (2) and (3) are, therefore, rectangular. The scalar pulse, g(t), is selected to satisfy limitations on transmitted power and bandwidth.

The individual transmission channels are characterized by bandpass impulse responses or by their Fourier transforms, $$\begin{bmatrix} h_v(t) \\ h_h(t) \end{bmatrix} = \begin{bmatrix} h_{i11}(t) \\ h_{i22}(t) \end{bmatrix} \cos\omega_0 t + \begin{bmatrix} h_{q11}(t) \\ h_{q22}(t) \end{bmatrix} \sin\omega_0 t. \quad (4)$$

To accommodate coupling between the polarized channels 21 and 23, two pairs of impulse responses, one pair 30, 32 associated with the co-channel and the other pair 34, 36 associated with the cross-channels, are used to characterize completely the medium.

Two independent noises, $$\gamma_{iv} \cos(\omega_0 t) + \gamma_{qv} \sin(\omega_0 t)$$

and $$\gamma_{ih} \cos(\omega_0 t) + \gamma_{qh} \sin(\omega_0 t)$$

are added to the cross polarized signals, respectively, at multipliers 62 and 64. These multipliers are located at receiver 50 of FIG. 1 where the signal plus noise is then coherently demodulated.

It is convenient to view the linear system as a four input port four output port network and characterize it as a four by four matrix impulse response or its Fourier transform which is the overall system frequency response.

The cross polarized signals on lead 63 having been mixed with the aforesaid noise signals are bifurcated into paths 51 and 53 and then delivered, respectively, to mixers 52 and 54 where the signals are mixed with the delayed carriers $\cos(\omega_0 t + \theta)$ and $\sin(\omega_0 t + \theta)$. Likewise, the cross polarized signals on lead 65 having been mixed with the aforesaid noise signals are bifurcated into paths 55 and 57 and then delivered, respectively, to mixers 56 and 58 where the signals are mixed with the carrier signals $\cos(\omega_0 t + \theta)$ and $\sin(\omega_0 t + \theta)$. These signals are then low pass filtered through elements 72, 74 and 76, 78 and then sampled by the sets of samplers 82 and 84; and, 86 and 88, respectively. Signals on output leads 81, 83 correspond with input leads 11, 13 and output leads 87, 89 correspond with input leads 17, 19.

Figure 2:
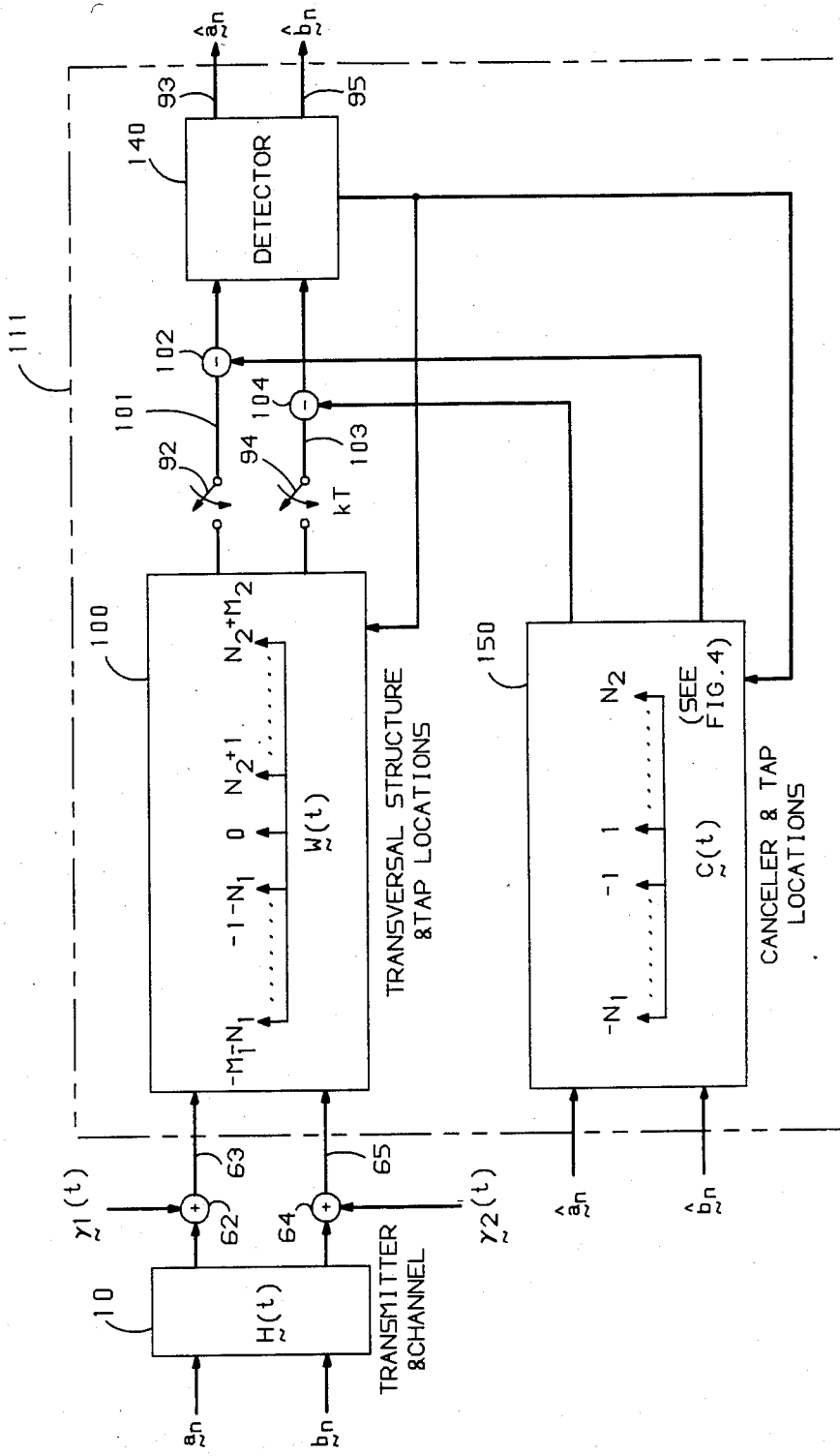
FIGS. 2, 3 and 4 show details of a receiver embodying the present invention.

Referring to FIG. 2, there is shown a block diagram useful in disclosing the present invention and comprising a transmitter and channel 10 and receiver 111. Receiver 111 comprises intersymbol interference equalizer 100, a linear matrix filter, the output from which is supplied to detector 140. Detector 140 compares the signal input thereto with an expected signal and produces an error from which a mean square error signal is generated and this error signal is transferred to cross polarization interference canceler 150 as well as to linear matrix filter 100. The characteristics of the aforesaid linear matrix filter 100 are selected so as to minimize the total mean square error. Canceler 150 produces adjusting signals proportional to the interferene caused by cross polarization and delivers these signals to subtracters 102 and 104. After the signals which adjust for cross polarization interference are subtracted from the filtered estimates, the resulting signals are substantially free from interference. Further detail of receiver 111 is shown in FIGS. 3 and 4.

Figure 3:
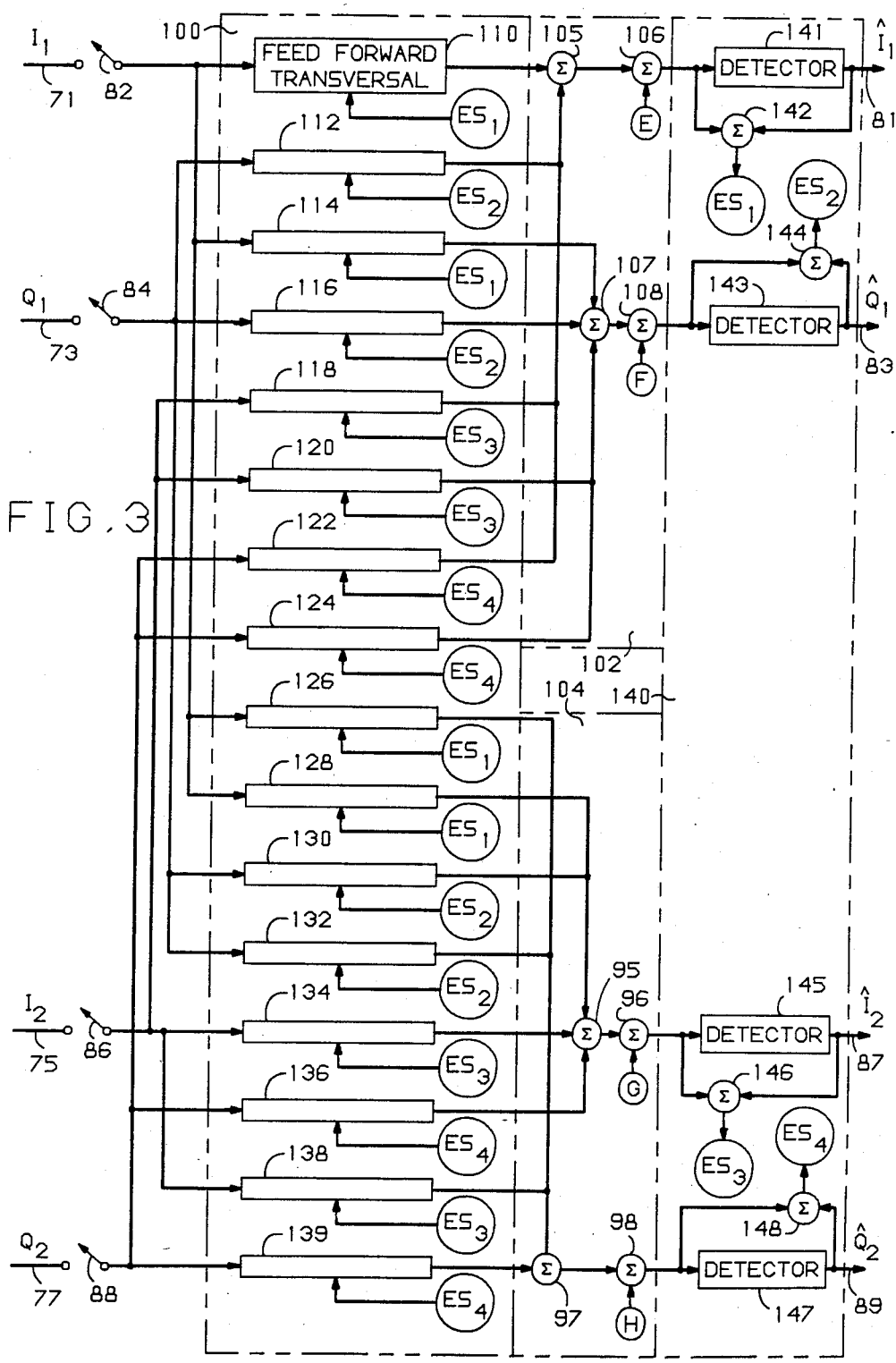
Figure 4:
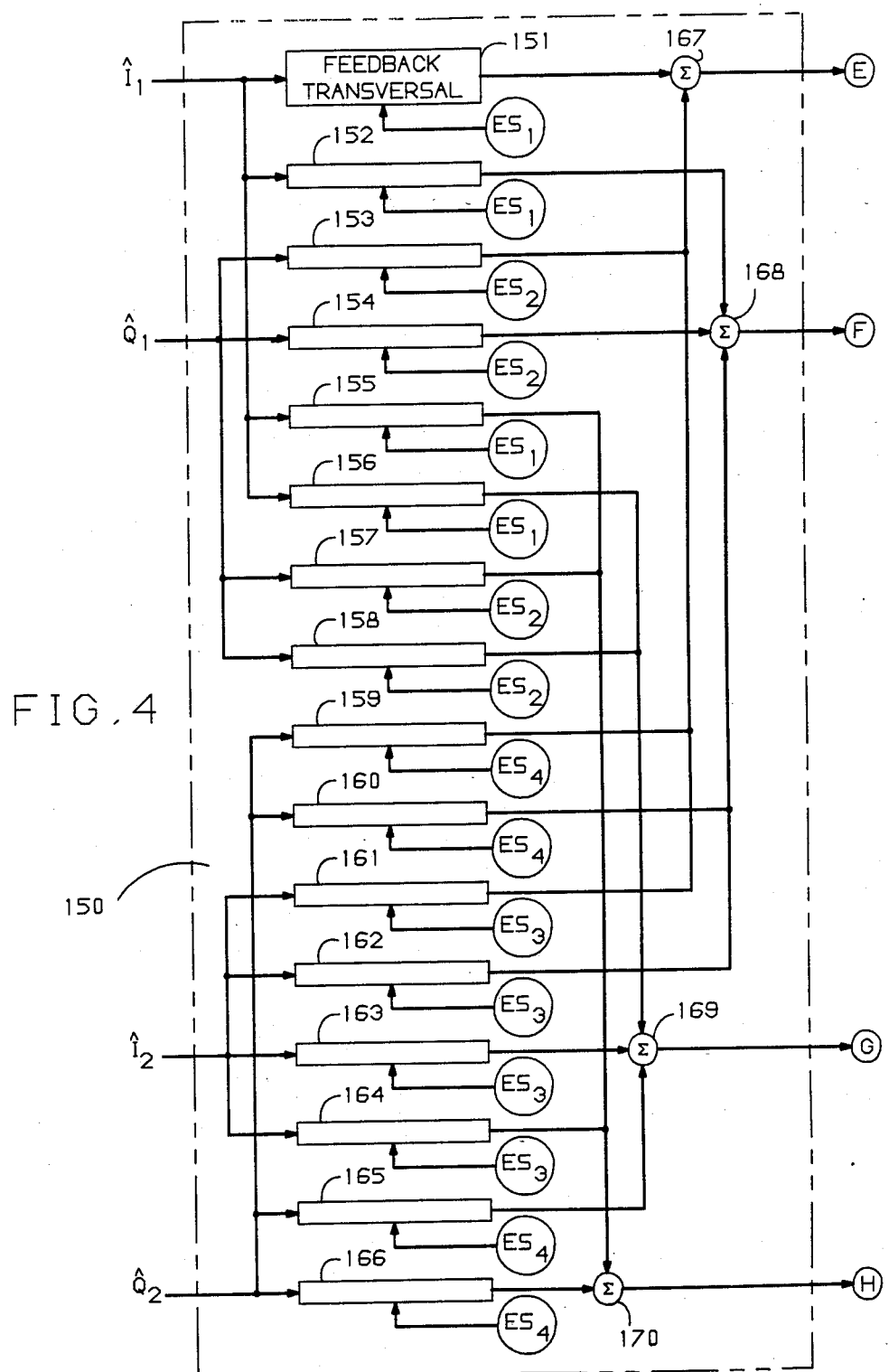

Referring to FIG. 3, there is shown an input signal $I_1$ on rail 71 and input signal $Q_1$ on rail 73. These two signals correspond with the signal on leads 63 of FIG. 2 prior to bifurcation. In order to effect comparison with FIG. 1, identical numbers are used where convenient. Likewise, the input signals $I_2$ on rail 75 and $Q_2$ on rail 77 correspond with the signals on lead 65 of FIG. 2 prior to bifurcation.

Input signals are sampled by samplers 82, 84, 86 and 88 prior to delivery to the feedforward transversal filters 110, 112, 114 . . . 139 for a digital system. For an analog system, the samplers appear after the filters as shown in FIG. 1 hereinabove.

Input signal $I_1$ is delivered to feedforward transveral filters 110, 114, 126 and to 128. Likewise, each of the other input signals is delivered to four feedforward transversal filters. The taps of each feedforward transversal filter are adjusted adaptively by error signals from a detector to be described hereinbelow. The output from feedforward transversal filter 110 is fed to mixer 105.

Because the other signals are coupled with this input signal $I_1$ during transmission, the other input signals, $Q_1$, $I_2$, and, $Q_2$, must be decoupled. Decoupling of these signals from input signal $I_1$ is effected by feeding the output signals from feedforward transversal filters 112, 118 and 122 to mixer 105. Likewise, each of the signals is decoupled from the others. In the preferred embodiment sixteen transversal filters are used. This is apparent because there are four input signals. Details of design are not disclosed in this application because such design is trivial to one skilled in the art.

The decoupled signals must be adjusted further by the output signals from the feedback transversal filters to be disclosed with reference to FIG. 4 hereinbelow. This is effected in mixers 106, 108, 96 and 98. The output from mixer 106, for example, is then sent to detector 141. The input to detector 141 is compared with the output therefrom in comparator 142 and the output is sent as error signal $ES_1$ to a plurality of filters for adaptive adjustment of the taps therein. Error signal $ES_1$ is sent, for example, to feedforward transversal filters 110, 114, 126 and 128 and to feedback transversal filters 151, 152, 155 and 156. Likewise, the taps of the remaining filters are adjusted adaptively by error signals from comparators 144, 146, and 148. The output signals from the detectors are substantially free from CPI and ISI.

Referring to FIG. 4, there is shown canceler 150 of FIG. 2 comprising a plurality of feedback transversal filters 151, 152, 153 ... 166 each being adjusted by an error signal from detector 140 of FIG. 2. Each feedback transversal filter has input thereto an output signal from detector 140. Thus, filter 151, for example, has input thereto the signal $\hat{I}_1$ from detector 141 of FIG. 3. The output signal from feedback transversal filter 151 is delivered to mixer 167. Also delivered to mixer 167 are output signals from filters 153, 159 and 161 so that these signals may be decoupled. The output from mixer is then delivered to mixer 106 of FIG. 3. Likewise, the other feedback filters of FIG. 4 cause the remaining signals to be decoupled.

The theoretical basis for the aforesaid apparatus of FIGS. 2, 3 and 4 is developed hereinbelow. If matrix filter 100 has an impulse response of W(t) and its output is evaluated at $t=0$, a column vector for the overall system response will be $$D_o(0) = U_o A_o + \sum_{\substack{n \\ n \neq 0}} U_n A_n + v_o \tag{5}$$

and $$U_n = \int_{-\infty}^{\infty} W(-\tau)H_o(\tau - nT)d\tau, \tag{6}$$

$$H_o(t) = \int_{-\infty}^{\infty} g(\tau)H(t - \tau)d\tau, \tag{7}$$

$$v_o = \int_{-\infty}^{\infty} W(-\tau)v(\tau)d\tau, \text{ and} \tag{8}$$

where H(t) is the transmitter and channel overall impulse response matrix.

A practical solution of the aforesaid equations comprises the construction of reasonable estimates of cross polarization interference and intersymbol interference, which are not necessarily optimum, and then subtracting these estimates from the signal incoming to the detector.

Assume that over a finite set of sampling instants, S, vector data symbols, $A_n$, where n is an element of S, are available at the receiver. Before making a final decision on the current symbol, $A_o$, a portion of the interference, $$\sum_{n \in S} U_n A_n,$$

is subtracted from $D_o(0)$. This is feasible because prior to $n=0$, symbols have been decoded. It is presumed that use is made of previously decoded symbols to improve on the current estimate of $A_o$. Because practical systems are not realizable relative to a large delay, there is a problem in using symbols which have not yet occurred. This problem can be overcome by introducing a delay, making tentative decisions, and then returning to modify the $A_o$ decision.

This answer depends on the system error rate prior to cancellation. For example, when the error rate is $10^{-4}$ and the cancellation window size is small relative to $10^4$, the probability that almost all of the symbols in this window have been correctly detected is fairly large. Thus, after cancellation, the error rate may be much improved. On the other hand, if the error rate prior to cancellation is high, no improvement after cancellation can be expected because the estimation of the interference is not reliable. Decision-directed cancellation as proposed here is successful over a certain range of error rates but fails when the error rate is high.

The performance criterion used is the least mean square error (MSE) normalized to the transmitted symbols variance, denoted $\sigma_d^2$. This is a mathematically tractable criterion to work with, and by minimizing MSE one also minimizes an exponentially tight upper bound on the error rate. Its use is also practically motivated because it lends itself to easy estimation, and it can be used to update transversal filter tap coefficients in practical adaptive systems.

The error vector $\epsilon$ is defined as the difference between $D_o(0)$, the output from equalizer 100, minus the output vector, from canceler 150, and the desired vector data symbol, $A_o$, $$\epsilon = U_o A_o + \sum_n U_n A_n - \sum_{n \in S} C_n A_n + v_o - A_o, \tag{9}$$

where, $n \neq 0$, and $C_n$ represents tap values in canceler 150.

$$MSE = tr[E\{\epsilon \epsilon^\nabla\}]. \tag{10}$$

where, "tr" stands for trace of a matrix, $E\{.\}$ denotes the mathematical expectation with respect to all random variables, and $\nabla$ represents the complex conjugate transpose.

The computation of equation (10) is straight forward and yields $$MSE = \sigma_d^2 \, tr \Bigg[ I - U_o - U_o^\nabla + \sigma^2 \int_{-\infty}^{\infty} W(t)W^\nabla(t)dt + \tag{11}$$

$$\sum_{n \in S}(U_n - C_n)(U_n - C_n)^\nabla + \sum_{n \in S} U_n U_n^\nabla \Bigg]$$

where, $$I \sigma_d^2 = E\{A_n A_n^\nabla\},$$

$$\sigma_d^2 = 2(M-1)/3,$$

M is the total number of QAM signal states, $$N_o I = E\{\gamma(t)\gamma^\nabla(t)\},$$

and $$\sigma^2 = N_o/\sigma_d^2.$$

The set of canceler matrices, $C_n$, $n \in S$, can immediately be determined. If they are not identically set to $U_n$, they can only increase the value of MSE. Consequently, if $C_n$ is set to be equal to $U_n$, where $n \in S$, then the residual MSE results in a function of the matrix impulse response, W(t), and the size of the cancellation window.

The minimization of MSE with respect to the matrix W(t) is accomplished by the use of the calculus of variations. After substituting for $U_n$, defined in equation (6), $$\frac{MSE}{\sigma_d^2} = tr \Bigg[ I - 2 \int_{-\infty}^{\infty} W(-\tau)H_o(\tau)d\tau + \tag{12}$$

$$\sigma^2 \int_{-\infty}^{\infty} W(-\tau)W^\nabla(-\tau)d\tau +$$

$$\sum_{n \in S} \int W(-\tau)H_o(\tau - nT)d\tau \int H_o^\nabla(\tau - nT)W^\nabla(-\tau)d\tau \Bigg].$$  (5)

In order to determine the optimum W, replace the matrix W in equation (12) by $$(W_o)_{ij} + (\epsilon\eta)_{ij},\ i,j = 1,2,3,4$$  (10)

where, $\eta_{ij}$ is arbitrary, and then set $$\delta/\delta\epsilon_{ij}(MSE) = [0]_{ij}$$  (13)

at $\epsilon_{ij} = 0$, $i,j = 1, 2, 3, 4$.

It is easy to verify that $$\frac{1}{\sigma_d^2}\frac{\partial}{\partial \xi_{ij}}(MSE) = tr\Bigg[-2\int_{-\infty}^{\infty}\eta_{ij}^o(\tau)H_o(\tau)d\tau +$$

$$2\sigma^2 \int_{-\infty}^{\infty} W_o(-\tau)\eta_{ji}^o(\tau)d\tau +$$

$$2\sum_{n \in S}\int_{-\infty}^{\infty} W_o(\tau)H_o(\tau - nT)d\tau \int_{-\infty}^{\infty} H_o^\nabla(\tau - nT)\eta_{ji}^o(\tau)d\tau\Bigg]$$

$$= 0,\ (i,j) = 1,2,3,4$$  (14)

where, the matrices, $\eta_{ij}^o$, where $(i,j) = 1, 2, 3, 4$ have the entry "1" in the $(1_{ij})^{th}$ position and zero everywhere else. By computing the trace of equation (14), the following expression is obtained:

$$-\int_{-\infty}^{\infty}(H_o(\tau))_{ji}\eta_{ij}^o(\tau)d\tau + \sigma^2 \int_{-\infty}^{\infty}(W_o(-\tau))_{ij}\eta_{ij}^o(\tau)d\tau +$$

$$\sum_{n \in S}\int [H_o(\tau - nT)U_n^\nabla]_{ji}\eta_{ij}^o(\tau)d\tau = 0,\ \text{where } (i,j) = 1,2,3,4.$$  (15)

Because equation (15) must hold for all functons of $\tau$ and $\eta_{ij}^o(\tau)$, the matrix integral equation that must be satisfied by the optimum matrix $W_o(\tau)$, is $$\sigma^2 W_o(-\tau) = H^\nabla(\tau) - \sum_{n \in S} U_n H_o^\nabla(\tau - nT).$$  (16)

The structure of $W_o(\tau)$ is interesting practically. It consists of a matched filter followed by a matrix tapped delay line where the matrix taps are zero for $n < S$. In other words, the linear transversal filter or equalizer specified in equation (16) operates over a range of matrix tap coefficients where the canceler is not operative. This is to avoid interaction between co-located taps and possible unstability problems. The structure is shown schematically in FIG. 2, described hereinabove. In practice, this structure is approximated and implemented by a finite transversal filter whose taps are adaptively updated as shown in FIGS. 3 and 4 hereinabove.

After multiplying equation (16) by $W^\nabla(-\tau)$, integrating, and then comparing the result with equation (12), an explicit formula for the optimum MSE is obtained:

$$MSE_o = \sigma_d^2 tr [I - U_o],$$  (17)

where $U_o$ is obtained by solving a set of infinite linear equations obtained by multiplying equation (16) by $H(\tau - kT)$ and then integrating. Thus, $$\sigma^2 U_k = R_k - \sum_{n \in S} U_n R_{k-n},\ \text{for all } k$$  (18)

where $$R_k = \int_{-\infty}^{\infty} H^\nabla(\tau)H(\tau - kT)d\tau$$  (19)

$$= R_{-k}^\nabla.$$

In order to evaluate the merits of the present invention, a solution for $U_o$ must exist. The task for solving equation (18), however, is complicated. It is made difficult by the fact that the matrix equations are not specified over the finite set, S. While the number of unknowns is infinite, the values at the gap window are not specified. A way around this dilemma was found in the scalar case solved by M. S. Mueller et al and disclosed in an article entitled, "A Unified Theory of Data-Aided Equalization," B.S.T.J. Volume 60, Number 11, Pages 2023 to 2038, November 1981. The same techniques are applied here.

First, equation (18) is separated into two equations, one for $k=0$ and the other for $k \neq 0$. Thus, $$U_o[I\sigma^2 + R_o] = R_o - \sum_{n \in J} U_n R_{-n},\ k = 0$$  (20)

and $$\sum_{n \neq J} U_n M_{k-n} = (I - U_o)R_k,\ k \in J$$  (21)

where the set J is defined as $$\{J:\ n \in J,\ n = -N_1, \ldots, 0, \ldots, N_2\}$$  (22)

and $$M_k = R_k + \sigma^2 \delta_{ok} I.$$  (23)

where $\delta_{ok}$ is the Kronecker delta function. The solution of equation (21) is facilitated by introducing a set of matrix variables $$\{V_n\}_{-\infty}^{\infty}$$

and a set of unknown matrices $$\{\Lambda_k\}_{-\infty}^{\infty}.$$

Using these matrices, equation (21) is written as:

$$\sum_{n=-\infty}^{\infty} V_n M_{k-n} = (I - U_o)(R_k - \Lambda_k),\ \text{for all } k.$$  (24)

For these doubly infinite sets of matrix equations to coincide identically with equation (21), the following constraints must hold:

$$\Lambda_n = 0,\ n \in J$$

and $$V_n = 0,\ n \in J.$$  (25)

If these can be satisfied, the solution to equation (24) will be identical to the solution of equation (21) with $Y_n = U_n$, $n \lessdot J$, and this is the sole purpose for introducing new variables. Evidently, equation (24) is easy to solve because it is in a form of a convolutional equation. To this end, define the inverse matrix sequences, $$[M_n^{(-1)}]_{-\infty}^{\infty}, \text{ as} \tag{26}$$

$$\sum_{n=-\infty}^{\infty} M_{(k-n)} M_n^{(-1)} = I \sigma_{ko}, \text{ for all } k.$$

Now, insert equation (26) into equation (24) to obtain explicitly the desired solution:

$$V_n = (I - U_o) \sum_{k=-\infty}^{\infty} (R_k - \Lambda_k) M_{k-n}^{(-1)}, \text{ for all } n. \tag{27}$$

From equation (27), a finite set of equations in the unknown matrices $\Lambda_k$ can be obtained because $V_n = 0$ for $n \, J$, $$\sum_{k=-\infty}^{\infty} R_k M_{k-n}^{(-1)} = \sum_{k \lessdot J} \Lambda_k M_{k-n}^{(-1)}, \, n \lessdot J. \tag{28}$$

By substituting the definition of $M_k$ from equation (23) into the left hand side of equation (28) and making use of equation (26), the desired equations for the unknown constraint matrices $\Lambda_k$, where $k \lessdot J$, is obtained:

$$I \sigma_{no} - \sigma^2 M_{-n}^{(-1)} = \sum_{k \lessdot J} \Lambda_k M_{k-n}^{(-1)}, \, n \lessdot J. \tag{29}$$

Returning to equation (24), when $k=0$ $$\sum_{n=-\infty}^{\infty} V_n M_{-n} = (I - U_o)(R_o - \Lambda_o) = \sum_{n \lessdot J} U_n R_{-n}, \tag{30}$$

where the last equality derives from the fact that $V_n = 0$, $n \lessdot J$, $V_n = U_n$, $n \lessdot J$ and $R_n = M_n$, $n \lessdot J$. Finally, by substituting equation (20) into equation (30)

$$(I - U_o)(R_o - \Lambda_o) = R_o - U_o[I\sigma^2 + R_o], \tag{31}$$

and solving for $I - U_o$ yields $$(I - U_o) = \sigma^2 [I\sigma^2 + \Lambda_o]^{-1}. \tag{32}$$

Substituting this into equation (17) provides an explicit expression for $MSE_o$ in terms of $\Lambda_o$ only, $$MSE_o = \sigma_d^2 tr[I + (\Lambda_o)/(\sigma^2)]^{-1}. \tag{33}$$

When the canceler window is doubly infinite in extent, one obtains the very best possible result. In other words, ISI and CPI have been eliminated substantially. In this special case, $N_1 = -\infty$ and $N_2 = \infty$, and equation (29) is now easy to solve $$I \sigma_{no} - \sigma^2 M_{-n}^{(-1)} = \sum_{k=-\infty}^{\infty} \Lambda_k M_{k-n}^{(-1)}. \tag{34}$$

By evaluating the Fourier series of both sides of equation (34)

$$I = \sigma^2 M^{(-1)}(\theta) + \Lambda(\theta) M^{(-1)}(\theta) \tag{35}$$

where a generic Fourier series pair representation is $$X(\theta) = \sum_{l=-\infty}^{\infty} x_l e^{j\theta l}$$

and $$x_l = \frac{1}{2\pi} \int_{-\pi}^{\pi} X(\theta) e^{-j\theta l} d\theta.$$

Because $M(\theta) = \sigma^2 I + R(\theta)$ and $M^{(-1)}(\theta)$ is in fact the inverse, $M^{-1}(\theta)$, it can be determined from equation (35) that $\Lambda(\theta) = R(\theta)$. Consequently, the zeroth coefficient of $\Lambda(\theta)$ is $$R_o = \frac{1}{2\pi} \int_{-\pi}^{\pi} R(\theta) d\theta,$$

and when this is substituted into equation (33) the desired matched filter bound is obtained:

$$MSE_o = \sigma_d^2 tr[I + R_o/\sigma^2]^{-1}. \tag{36}$$

This will serve as a lower bound to attainable performance to which all other results are compared.

In this case, the canceler is absent and so $N_1 = N_2 = 0$. Here, equation (29) reduces to $$I - \sigma^2 M_o^{(-1)} = \Lambda_o M_o^{(-1)}, \tag{37}$$

and solving for $M_o^{(-1)}$:

$$M_o^{(-1)} = \frac{1}{\sigma^2} \left[ I + \frac{\Lambda_o}{\sigma^2} \right]^{-1} \tag{38}$$

$$= \frac{1}{2\pi} \int_{-\pi}^{\pi} M^{-1}(\theta) d\theta$$

$$= \frac{1}{2\pi\sigma^2} \int_{-\pi}^{\pi} \left[ I + \frac{R(\theta)}{\sigma^2} \right]^{-1} d\theta.$$

It can now readily be derived that $$MSE_o = \frac{\sigma_d^2}{2\pi} \int_{-\pi}^{\pi} tr \left[ I + \frac{R(\theta)}{\sigma^2} \right]^{-1} d\theta, \tag{39}$$

In this application, it is assumed that all the casual terms, which depend only on past decisions, are canceled in addition to a finite number of noncasual terms. This implies that $N_2 = \infty$ and $N_1$ is finite. When $N_1 = 0$, the canceler becomes a decision feedback equalizer because causal interference can be canceled by a feedback circuit. Here, it is necessary to determine MSE for the more general case when $N_1$ is not necessarily zero.

It is more convenient to solve for $U_o$ directly from equation (21) than through equation (29). Equation (21) is rewritten as:

$$\sum_{k=-\infty}^{-N_1} U_k M_{m-k} = (I - U_o) R_m, \text{ where } m \leq -N_1, \tag{40}$$

which is recognized to be a matrix Weiner-Hopf equation, and its solution depends on being able to factor positive definite Hermitian matrices.

Proceeding with the solution of equation (40), the following sequence of matrices is introduced $$M_n^+ = [0], n < 0$$

$$M_n^- = [0], n \geq 0,$$

such that $$M_m = \sum_{n=0}^{\infty} M_{m-n}^- M_n^+, \text{ for all } m. \quad (41)$$

Substituting equation (41) into equation (40) and rearranging yields two sets of equations $$\sum_{n=0}^{\infty} y_{m-n} M_n^+ = (I - U_o) R_m, \text{ for all } m \quad (42)$$

and $$\sum_{k=-\infty}^{-N_1} U_k M_{m-k}^- = y_m, \, m \leq -N_1. \quad (43)$$

The procedure for solving these is to solve first for $Y(\theta)$ from equation (42) in terms of $M^-(\theta)$, an easy task in terms of the Fourier transforms of $\{M_n^-\}$ and $\{Y_n\}$. Having obtained $Y(\theta)$, one proceeds to solve equation (43) for $U(\theta)$ in terms of $M^\nabla(\theta)$. Note that equation (41) implies $$M(\theta) = M^-(\theta) M^+(\theta),$$

and because $M(\theta)$ is Hermitian, $M(\theta) = M^\nabla(\theta)$, implying $(M^+(\theta))^\nabla = M^-(\theta)$, $(M^-(\theta))^\nabla = M^+(\theta)$, and the factorization problem is reduced to finding a matrix $M^+(\theta)$ such that $$M(\theta) = [M^+(\theta)]^\nabla M^+(\theta)$$

where the entries in $M^+(\theta)$, $(M^+(\theta))_{ij}$ are such that $(M^+(\theta))_{ij}$ has a Fourier series with only positive frequency coefficients.

Multiply both sides of equation (43) by $M^+_{-m}$ and sum m from $-\infty$ to $-N_1$ as a first step to determine the sequence of $y_m$. This gives $$\sum_{m=-\infty}^{-N_1} y_m M_{-m}^+ = \sum_{k=-\infty}^{-N_1} U_k M_{-k}. \quad (44)$$

Recalling that $M_k = R_k + \sigma^2 \delta_{ko} I$, equation (42) can be placed in the form $$\sum_{n=0}^{\infty} y_{m-n} M_n^+ = (I - U_o) R_m, \text{ for all } m, m \neq 0. \quad (45)$$

When this is compared with equation (41), $$y_m = (I - U_o) M_m^-, \text{ for } m \neq 0, \quad (46)$$

and when substituted into equation (44), $$(I - U_o) \sum_{m=-\infty}^{-N_1-1} M_m^- M_{-m}^+ = \sum_{m=-\infty}^{-N_1-1} U_m M_{-m} \quad (47)$$

$$= (I - U_o) \sum_{m=-\infty}^{-N_1-1} M_m^- (M_m^-)^\nabla.$$

From equation (30), $$\sum_{n=-\infty}^{-N_1-1} U_n M_{-n} = (I - U_o)(R_o - \Lambda_o), \quad (48)$$

and so it can be concluded that $$R_o = \Lambda_o = \sum_{n=-\infty}^{-N_1-1} M_n^- (M_n^-)^\nabla. \quad (49)$$

Substituting again for $R_o = M_o - I\sigma^2$ in equation (49) and rearranging, $$I\sigma^2 + \Lambda_o = \sum_{n=-N_1}^{0} M_n^- (M_n^-)^\nabla, \quad (50)$$

because $$M_o = \sum_{n=0}^{\infty} M_{-n}^- M_n^+$$

$$= \sum_{n=0}^{\infty} M_{-n}^- (M_{-n}^-)^\nabla$$

$$= \sum_{n=-\infty}^{0} M_n^- (M_n^-)^\nabla;$$

hence, $$I\sigma^2 + \Lambda_o = -\sum_{n=-\infty}^{-N_1-1} M_n^- (M_n^-)^\nabla + \sum_{n=-\infty}^{0} (M_n^-)(M_n^-)^\nabla$$

$$= \sum_{n=-N_1}^{0} M_n^- (M_n^-)^\nabla.$$

Substituting equation (50) into equation (33) gives the result $$MSE_o = \sigma_d^2 \, tr \left[ I + \frac{\Lambda_o}{\sigma^2} \right]^{-1} \quad (51)$$

$$= \sigma_d^2 \, tr \left[ \frac{1}{\sigma^2} \sum_{n=-N_1}^{0} M_n^- (M_n^-)^\nabla \right]^{-1}.$$

When $N_1 = 0$, that is, when there is not anticausal cancellation, $$MSE_o = \sigma^2 tr [M_o^2 / \sigma^2]^{-1}, \quad (52)$$

where $M_o = M_o^- = (M_o^+)^\nabla$. This is the formula for decision feedback equalization derived by Foschini et al for QAM transmission over a single channel which they cast in a matrix formulation in a paper entitled, "Theory of Minimum Mean-Square-Error QAM Systems Employing Decision Feedback Equalization," B. S. T. J. Volume 52, Number 10, pages 1821 to 1849, December 1973. The form of the answer generalizes to arbitrary dimensions.

The theoretical results derived so far apply to an ideal canceler of any window size and an infinite tap linear equalizer whose matrix taps vanish inside the cancellation window. In order to assess the penalties incurred by a finite tap linear equalizer, outside the cancellation window, the least MSE formulae applicable to this case are derived. With these formulae the merits of equalization and cancellation using only a finite number of matrix taps can be evaluated. An insight into the best way of deploying the total number of available taps, furthermore, can be obtained. Also inherent in the theory derived so far is the independence of MSE on sampling phase. This is so because the transversal equalizer and canceler is preceded by a matched filter whose structure presumes knowledge of sampling phase. Here, this condition is relaxed and the MSE is derived for a front end filter matched to the transmitter filter only rather than to the overall channel response and, thereby, bring out the dependence of MSE on timing phase.

The finite tap delay line matrix filter is represented by $$W_{fo}(-\tau) = \sum_{n \in F} g(t - nT) Q_n \quad (53)$$

where the two sets F and S are disjoint and F now is a finite set, $$\{F: n \in F, n = -N_1 - M_1, \ldots, -N_1 - 1 - 1, 0, N_2 + 1, \ldots, N_2 + M_2\}.$$

In equation (53), g(t), as before, is a scaler pulse shape, while $\{Q_n\}_{n \in F}$ is a 4×4 matrix sequence. The objective now is to select the $Q_n$'s which minimize the total MSE, equation (12), $$\frac{MSE}{\sigma_d^2} = \quad (54)$$

$$tr\left[ I - 2U_o + \sigma^2 \int_{-\infty}^{\infty} W_f(\tau) W_f^{\nabla}(\tau) d\tau + \sum_{n \in S} U_n U_n^{\nabla} \right].$$

Substituting equation (53) into equation (54) yields $$\frac{MSE}{\sigma_d^2} = 2 - 2 \sum_{n \in F} tr[Q_n H_{-n}] + \quad (55)$$

$$\sum_{n,m \in F} tr[Q_n G_{nm} Q_m^{\nabla}] + \sigma^2 \sum_{n,m \in F} tr[Q_n \rho_{n-m} Q_m^{\nabla}]$$

where the $H_n$'s are defined in equation (12) and $$\begin{cases} G_{nm} = \sum_{1 \in S} H_{1-n} H_{1-m}^{\nabla} \\ \rho_n = \int_{-\infty}^{\infty} g(t) g(t - nT) dt. \end{cases} \quad (56)$$

Setting the derivatives of equation (55) with respect to the elements of the matrices $\{Q_n\}_{n \in F}$ to zero, a set of linear matrix equations is obtained for the unknowns, $\{Q_n\}_{n \in F}$, namely, $$H_{-n}^{\nabla} = \sum_{1 \in F} Q_1 R_{1n}, \quad n \quad F \quad (57)$$

where $$R_{1n} = G_{1n} + \sigma^2 \rho_{n-1}, \quad n, 1 \quad F. \quad (58)$$

The solution of equation (57) is straightforward and will be discussed hereinbelow.

For now, label the solution to equation (57) by $Q_1^o$, the optimal $Q_1$'s. Multiply the result by $Q_n^1$, then sum over $n \in F$ and substitute the result into equation (57). This yields the desired formula for the least means square error (MSE)

$$MSE_o = \sigma_d^2 \, tr\left[ I - \sum_{1 \in F} Q_1^o H_{-1} \right]. \quad (59)$$

Referring to FIG. 2, when linear equalizer 100 has a finite tap window size, the structure of optimum receiver 111 comprises a receive filter (not shown) matching the transmit filter (not shown) followed by a matrix transversal filter 100 and a matrix canceler 150. The most general case under this assumption is when the matrix canceler has a finite member of causal and anticausal taps and the solution of equation (29) for $\Lambda_o$ provides a means of calculating minimum means square error by use of equation (33). In order to solve for $\Lambda_o$, block matrices $M_k^{(-1)}$'s defined in equation (26) have to be determined first. One way to determine the $M_k^{(-1)}$'s is to solve equation (33) by a Levinson-type algorithm where the entries are block matrices. Thus, matrix convolution equation (26) is represented as:

$$\begin{vmatrix} M_o & M_{-1} & M_{-2} & & & \\ M_1 & M_0 & M_{-1} & & & \\ M_2 & M_1 & M_0 & & & \\ \cdot & \cdot & \cdot & \cdot & & \\ \cdot & \cdot & \cdot & \cdot & & \\ \cdot & \cdot & \cdot & \cdot & M_{-1} \\ \cdot & \cdot & \cdot & M_1 & M_1 \end{vmatrix} \cdot \begin{vmatrix} \cdot \\ \cdot \\ \cdot \\ M_{-1}^{(-1)} \\ M_0^{(-1)} \\ M_1^{(-)} \\ \cdot \end{vmatrix} = \begin{vmatrix} 0 \\ \cdot \\ \cdot \\ 0 \\ I \\ 0 \\ \cdot \\ 0 \end{vmatrix} \quad (60)$$

where I is the identity matrix. As observed, the block Toeplitz matrix equation can be solved for $M_k^{(-1)}$'s, with the $M_K$'s given in equation (23). Having the $M_k^{(-1)}$'s and expressing equation (29) in the form:

$$[\Lambda_{-N_1} \Lambda_{-N_1+1} \ldots \Lambda_{-1} \Lambda_o \Lambda_1 \ldots \Lambda_{N_2}] \cdot \quad (61)$$

$$\begin{vmatrix} M_o^{(-1)} & M_{-1}^{(-1)} & & M_{-(N_1+N_2)}^{(-1)} \\ M_1^{(-1)} & M_0^{(-1)} & & \cdot \\ \cdot & \cdot & \cdots & \cdot \\ \cdot & \cdot & \cdots & \cdot \\ M_{(N_1+N_2)}^{(-1)} & M_{(N_1+N_2-1)}^{(-1)} & & M_o^{(-1)} \end{vmatrix} =$$

$$[-\sigma^2 M_{N_1}^{(-1)} \ldots (-\sigma^2 M_o^{(-1)} + I) \ldots -\sigma^2 M_{-N_2}^{(-1)}]$$

it is possible to evaluate $\Lambda_o$.

When matrix canceler 150 has knowledge of an infinite number of past data symbols, it becomes a decision feedback equalizer. In addition, it may also employ a finite member of anticausal taps to operate on future symbols in which case it becomes a finite window canceler. This can be accomplished with a finite delay. As shown in equation (40) to determine $MSE_o$, a matrix Weiner-Hopf equation has to be solved. This involves determination of anticausal factors of the $M(\theta)$ matrix as explained hereinabove.

There are at least two computational algorithms available for solving a matrix Weiner-Hopf equation. One method converts the matrix that has to be factored directly into a nonlinear difference equation of a Ricatti type, which converges to a stable solution. Another method, which is adopted in this invention comprises a Bauer-type factorization of positive definite polynomial matrices. This algorithm is suited to sampled data applications and takes advantage of the periodic and positive nature of the channel covariance matrix, $M(\theta)$, as in this embodiment. It performs the factorization in the following steps. Suppose one desires to factor the $n \times n$ matrix $M(\theta)$:

$$M(\theta) = M^-(\theta) M^+(\theta).$$

This matrix has a Fourier series expansion, $$M(\theta) = \sum_{m=-\infty}^{\infty} A_m e^{jm\theta}, \qquad (62)$$

whose $n \times n$ coefficients, $$A_m = \frac{1}{2\pi} \int_{-\pi}^{\pi} e^{-jm\theta} M(\theta) d\theta, \qquad (63)$$

approach $O_m$ as $|m|$ becomes infinitely large. One now follows these steps:

Step 1:
Form the following variable size Toepliltz matrices $$T_m = \begin{bmatrix} A_0 & A_1 & \cdots & A_m \\ A_{-1} & A_0 & & A_{m-1} \\ \vdots & & & \vdots \\ A_{-m} & A_{-m+1} & \cdots & A_0 \end{bmatrix}, \qquad (64)$$

of respective sizes $$(m+1)n \times (m+1)n, \; m=0, \ldots \infty,$$

that are Hermitian and real.
Step 2:
For every $m \geq 0$, perform the Cholesky's factorization $$T_m = L_m^T \cdot L_m \qquad (65)$$

where $L_m^T$ is the transpose of $L_m$, and $L_m$ is a square, real and lower triangular matrix with positive diagonal scalar entries, $$L_m = \begin{bmatrix} L_{00}^{(m)} & & & & \\ L_{10}^{(m)} & L_{11}^{(m)} & & 0 & \\ \vdots & & \ddots & & \\ \vdots & & & & \\ L_{m0}^{(m)} & L_{m1}^{(m)} & \cdots & & L_{mm}^{(m)} \end{bmatrix}. \qquad (66)$$

All blocks in equation (66) are real $n \times n$ and all $L_{rr}^{(m)}$, $r = 0, \ldots, m$ are lower triangular.
Step 3:
It has been proved by D. C. Youla et al that for every fixed $r$ and $k$, $r \geq k \geq 0$, $$\lim_{m \to \infty} L_{rk}^{(m)} = M_{r-k}^+. \qquad (67)$$

The factorization of equation (65) and the evaluation of $M_{r-k}^+$ in equation (67) is performed numerically. To find an upper bound on m for stopping the calculations, a convergence point must be established. This can be done by checking the trace of $M_{r-k}^+$ in each iteration in order to determine whether it has reached a level of constancy, and, if so, for what value of m. This completes the factorization. Indeed, Youla et al showed that a constant trace as a function of m corresponds to a minimum of a quadratic functional:

$$I(P) = \frac{1}{2\pi} \int_{-\pi}^{\pi} tr[P^{\nabla}(\theta) M(\theta) P(\theta)] d\theta \qquad (68)$$

where $P(\theta)$ is a polynomial matrix of the form $$P(\theta) = \sum_{r=0}^{m} x_r e^{(-jr\theta)}, \qquad (69)$$

with the quadratic functional of equation (68) expressed as $$I(P) = tr[X^{\nabla} T_m X]. \qquad (70)$$

where $T_m$ was defined in equation (64) and $x_r$'s represent the elements of X. Hence, there is a theoretical base for establishing the convergence point.

Finally, consider the case where the matrix linear equalizer operates on a finite set of taps that do not overlap with those of the finite tap matrix canceler. This is a case of great practical interest. Here, the receiver filter is assumed to have a square root Nyquist transfer function matching the transmit filter. Becuase it no longer matches the overall channel and transmitter characteristics, $MSE_o$ is a function of timing phase. Therefore, an optimum timing reference has to be established before the optimum nonstationary covariance matrix can be determined. This is accomplished here by minimizing the mean square eye closure (MS−EC) which is a measure of the amount of received level perturbation caused by CPI and ISI. In this invention, it is assumed that the demodulator removes the channel phase at the optimum sampling time reference. Once an optimal set of samples is found, the covariance matrix, $G_{nm}$, of equation (56) is formed as:

$$G_{nm} \atop n,m \leqslant F = \begin{bmatrix} G_{-(N1+M1),-(N1+M1)} & G_{-(N1+M1),-(N1+M1-1)} & \cdots & G_{-(N1+M1),(N2+M2)} \\ G_{-(N1+M1-1),-(N1+M1)} & & & \\ \vdots & & & \\ G_{-(N1+1),-(N1+M1)} & & & \\ G_{0,-(N1+M1)} & & & \\ G_{(N2+1),-(N1+M1)} & & & \\ \vdots & & & \\ G_{(N2+M2),-(N1+M1)} & & & G_{(N2+M2),(N2+M2)} \end{bmatrix} \quad (71)$$

In terms of the $H_n$'s defined in $$H_n = \int_{-\infty}^{\infty} g(\tau - nT) \cdot H(-\tau)d\tau$$

the covariance matrix can be expressed as:

$$G_{nm} = \sum_{l \in S} \begin{bmatrix} H_{1+N1+M1} \\ \vdots \\ H_{1+N1+1} \\ H_1 \\ H_{1-N2-1} \\ \vdots \\ H_{1-N2-M2} \end{bmatrix} \cdot [H^{\nabla}_{1+N1+M1} \cdots \quad (72)$$

$$H^{\nabla}_{1+N1+1} H^{\nabla}_1 H^{\nabla}_{1-N2-1} \cdots H^{\nabla}_{1-N2-M2}]$$

Hence, by adding $\sigma^2$ to the diagonal elements of $G_{nm}$, the matrix $R_{nm}$ is formed, as expressed in equation (58). The $Q_n$'s, that is the coefficients of the finite window equalizer, can be computed as follows:

$$[Q_{-(N1+M1)} \cdots Q_{-N1-1} Q_0 Q_{N2+1} \cdots \\ Q_{N2+M2}] = [H^{\nabla}_{(N1+M1)} H^{\nabla}_{(N1+M1-1)} \cdots \\ H^{\nabla}_{-(N2+M2)}] \cdot [R_{nm}]^{-1} \quad (73).$$

These coefficients are used in equation (59) to determine the optimum MSE.

The cross polarization fading propagation model employed has the frequency characteristics represented by the complex matrix:

$$C(\omega) = \begin{bmatrix} C_{11}(\omega) & C_{21}(\omega) \\ C_{12}(\omega) & C_{22}(\omega) \end{bmatrix} \quad (74)$$

where the functional form of $C_{11}(\omega)$ and $C_{22}(\omega)$ is that of a single in line fading channel model, with the generic representation, $$C_{11}(\omega) = a[1 - \rho e^{j\phi} e^{-j\omega\tau}], \quad (75)$$

where a and $\rho$ are real variables representing flat and dispersive fading levels, $\phi$ is related to the fade notch offset, and $\tau$ is the delay between direct and reflected paths assumed to be 6.3 nano seconds. Also in the model, $$C_{22}(\omega) = a[1 - \rho e^{j\phi} e^{-j(\omega - \Delta\omega)\tau}] \quad (76)$$

which is in the same form as $C_{11}(\omega)$, except for an additional variable $\Delta\omega$ that allows non co-located fade notches to occur on the two polarization signal transfer characteristics. Cross polarization paths are assumed to behave as $$C_{21}(\omega) = K_1 C_{11}(\omega) + K_2 C_{22}(\omega) + R_3 e^{-j\omega D1} \quad (77)$$

and $$C_{12}(\omega) = K_4 C_{11}(\omega) + K_5 C_{22}(\omega) + R_6 e^{-j\omega D2} \quad (78)$$

where $K_1$, $K_2$, $K_4$, and $K_5$ are constants which incorporate the nonideal properties of antennas and waveguide feeds at both ends of the channel, typically taking on values varying from one hop to another in the $-35$ to $-20$ dB range. The last term in equations (77) and (78) represents a nondispersive cross polarization response contributed by an independent ray. In the present invention, $R_3$, $R_6$, and $\Delta\omega$ are assumed to be zero and the $K_i$'s are assumed to be $-20$ dB Computation of the channel covariance matrix is the initial necessary step behind all th $MSE_o$ calculations.

In the case of the infinite window size equalizer discussed hereinabove, the receiver filter is assumed to be a matched filter; hence, no reference timing establishment is necessary. The peak of the correlation function serves as a timing reference. By computing the sampled correlation matrix of equation (19) the normalized $MSE_o$ can be calculated.

In application of the finite window equalizer which is shown in detail in FIG. 3, a set of optimum samples of overall impulse response is found by establishing a timing reference, $t_o$, for which the mean square eye closure of the received in line signal is a minimum, and at this reference the channel phase is removed. This has to be done for the two polarized signals independently.

The overall transfer function matrix is given by $$H(\omega) = C(\omega) \cdot P(\omega) \quad (79)$$

where $C(\omega)$ is the propagation transfer matrix and $P(\omega)$ is the Nyquist shaping filter transfer matrix. For instance, if the impulse response of the vertical in line signal is $$h_{il}(t) = a[p(t) - \rho e^{j\phi} p(t - \tau)] \quad (80)$$

where p(t) is a Nyquist shaped pulse, the channel phase becomes $$\theta(t) = \text{Arc } tg \frac{-\rho\sin(\phi) \, p(t-\tau)}{p(t) - \rho\cos(\phi) \, p(t-\tau)}, \quad (81)$$

and the upper row block matrices of the overall impulse response matrix have to be multiplied by $e^{-j\theta(t_o)}$. I, I being the unity matrix, in order to remove the channel phase at $t_o$.

In order to provide a single set of curves for $MSE_o$, independent of the number of transmit states in M—QAM signal space, the $MSE_o$ is normalized as defined in equations (33), (36), (39), (51), (52), and (59) by dividing the formulas by $\theta_d^2$, that is, the transmitted symbols variance. In addition, the normalized $MSE_o$ is computed for only one of the M-QAM signals that comprise the dually polarized signal, $S_y(t)$.

If the unfaded signal to noise ratio, SNR, is defined by $\Gamma$ it can be verified that in the case of a matched filter receiver, the normalized $MSE_o$ in the absence of any cross polarization interference, that is, $K_1$, $K_2$, $K_4$, $K_5$, $R_3$, $R_6 = 0$, is simply $$\frac{1}{\sigma_d^2} MSE_o = \frac{1}{1+\Gamma} \quad (82)$$

and, consequently, for a large unfaded SNR, it becomes $\Gamma^{-1}$. Hence, equation (82) establishes an ultimate performance bound which can only be achieved in utopian environment. In a dually polarized system with a finite amount of non dispersive coupling that is, $K_1$, $K_2$, $K_4$, $K_5 > 0$, the matched filter bound is degraded somewhat. for $K_1 = K_2 = K_4 = k_5 = -20$ dB, there was found a small amount of degradation in the ideal $MSE_o$ which is not a function of the dispersive fade depth and only diminishes when there is no cross coupling, that is, in a completely orthogonal system.

It is assumed that the transmit filter is square root Nyquist shaped and the receive filter either matches the overall transmitter and channel or the transmitter only. A Nyquist roll off of 45 percent, both a 40 MHz channel and a 22 MHz channel bandwidth, and a SNR of 63 dB are used in our numerical evaluations.

Figure 5:
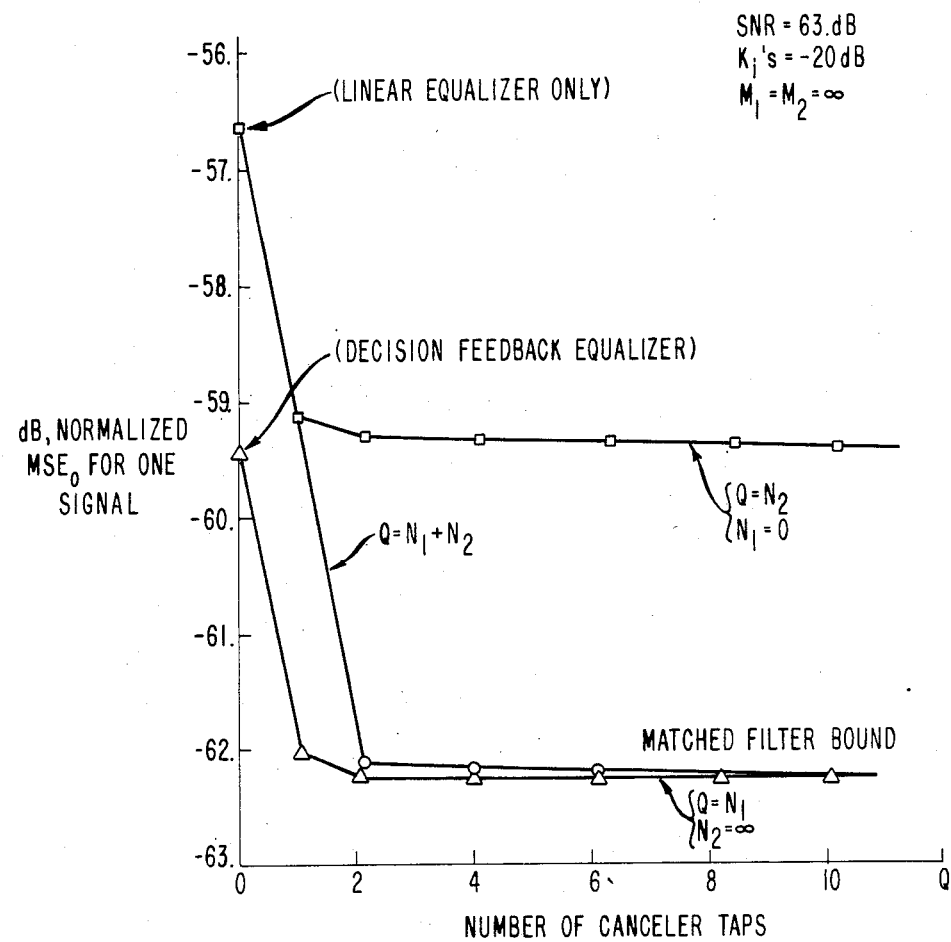
FIGS. 5 through 11 show curves for evaluating the performance of the aforesaid receiver embodying the present invention.

Referring to FIG. 5, there is depicted the normalized $MSE_o$ as a function of the number of canceler taps, Q, when a 40 dB centered fade over a 22 MHz channel band is applied to both polarized signals. The linear equalizer in this case possesses an infinite number of taps. The case of pure linear equalization, $N_1 = N_2 = 0$, that is, no cancellation, exhibits the largest $MSE_o$ degradation relative to the asymptotic matched filter bound. This is due to the noise enhancement experienced by the linear equalizer during deep fades. When both causal and anticausal canceler taps are present, all the curves rapidly approach the matched filter bound for a finite constant coupling, $K_i = -20$ dB, $i = 1,2,4,5$. The curve for a decision feedback type canceler starts at ideal decision feedback equalizer normalized $MSE_o$ and approaches the asymptotic value with two anticausal taps. The finite window size canceler curve starts at the linear equalizer case, $N_1 = N_2 = 0$, and reaches the matched filter bound asymptotic value with a total of four causal/anticausal taps. Finally, when no anticausal taps are employed, the curve asymptotically approaches the ideal decision feedback case with only two causal taps.

Figure 6:
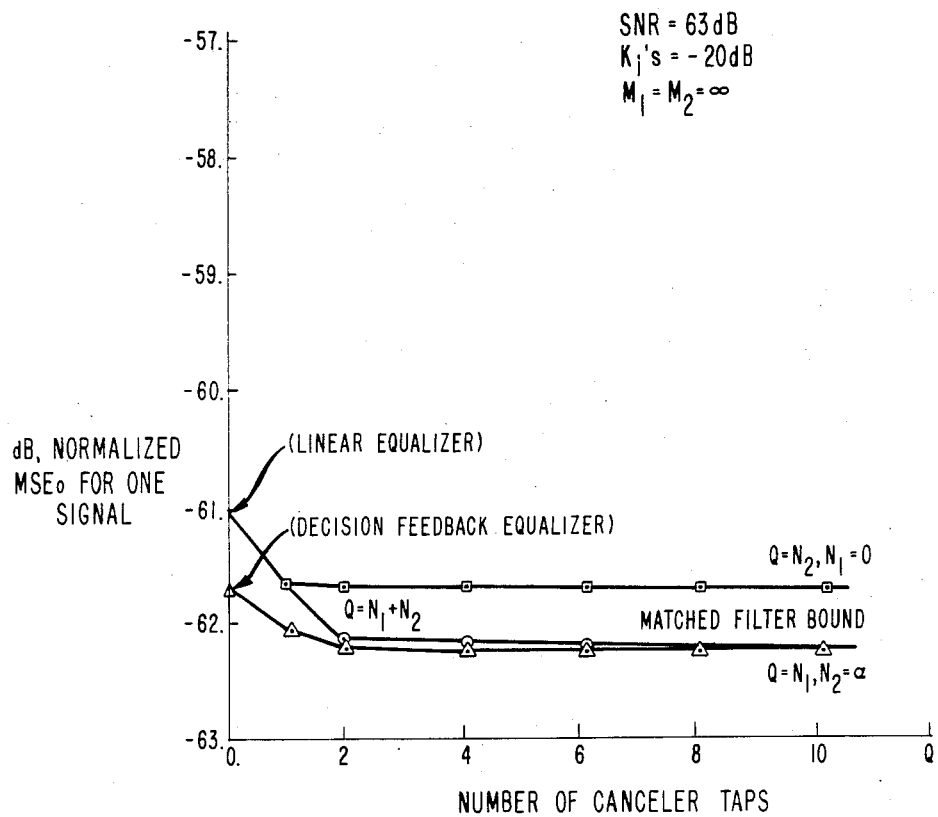

Referring to FIG. 6, there is depicted similar results as in FIG. 5 for the case when the centered fade notch depth is reduced to 20 dB over a 22 MHz channel. As can be observed the linear equalizer, $N_1 = N_2 = 0$, performance is improved. In both FIGS. 5 and 6, the fade notch is located at the band center. In both cases, because the receiver filter matches the overall channel and transmitter, an offset fade notch does not have a serious impact on the results for the same fade notch depth.

Figure 7:
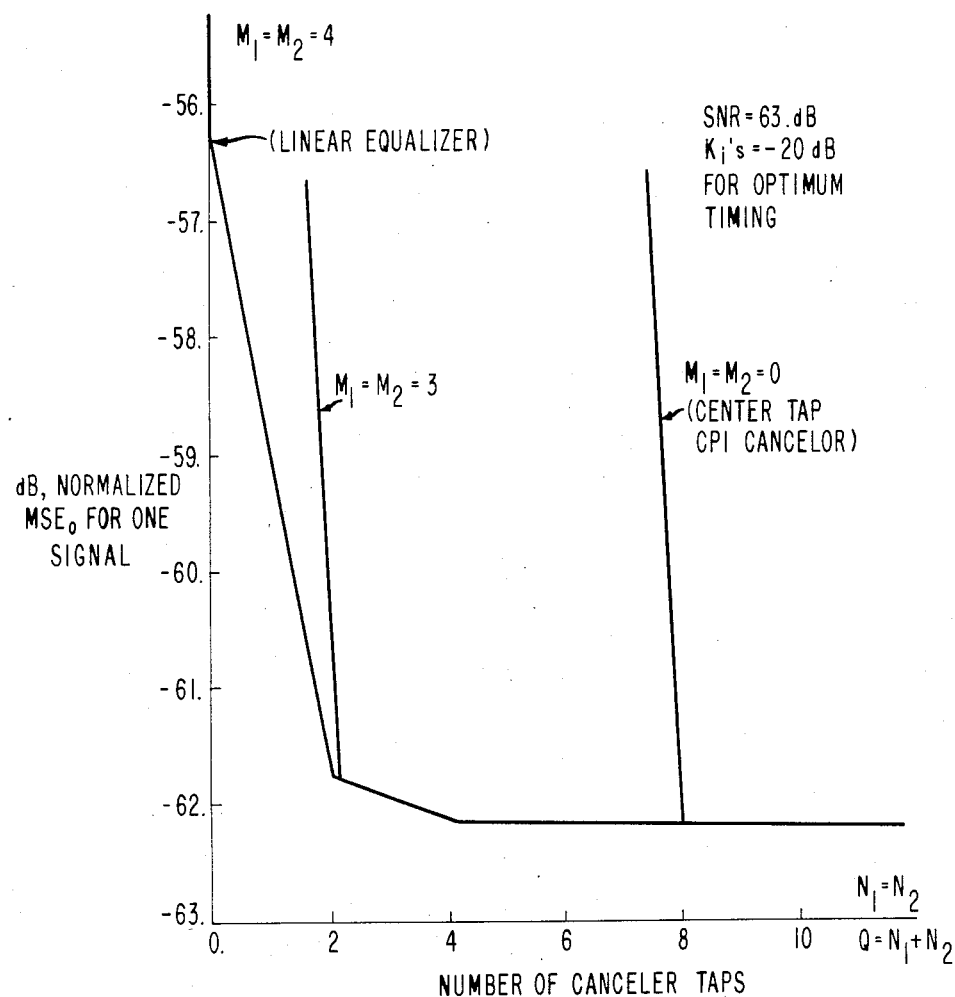
Figure 8:
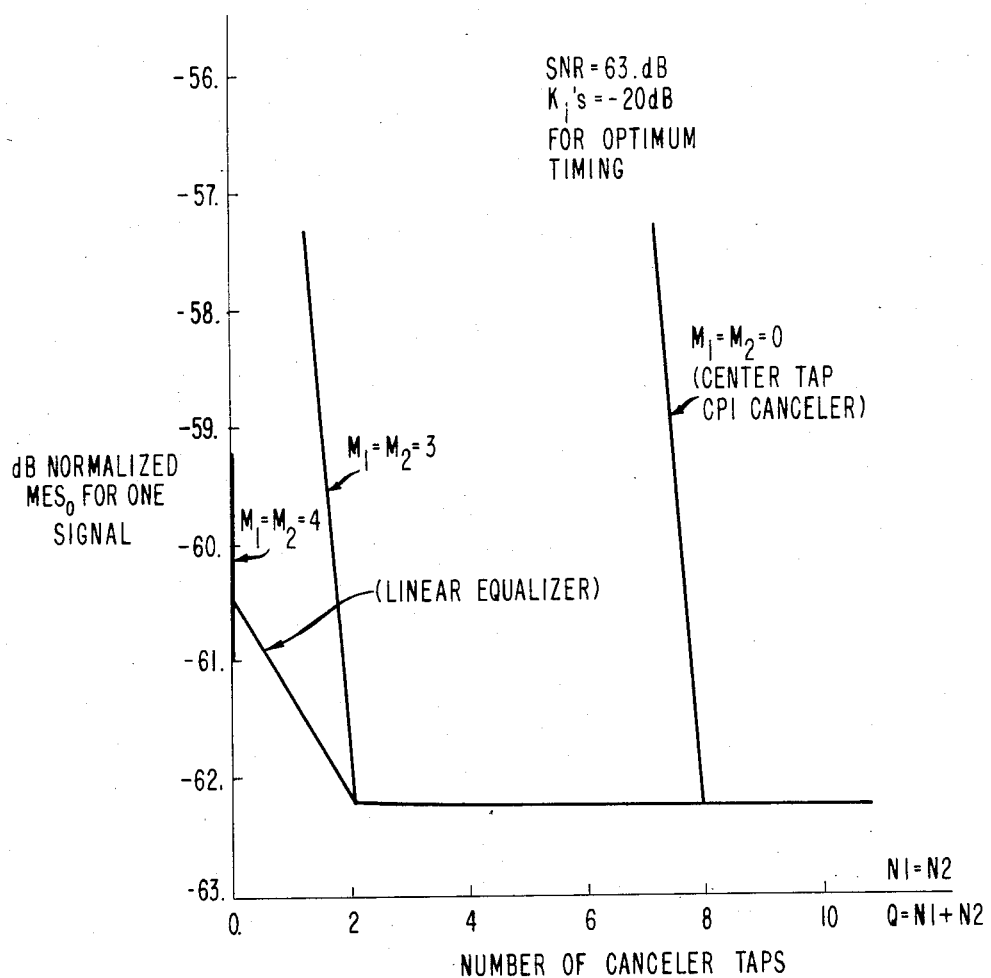

Referring to FIGS. 7 and 8, there is depicted in each, the achievable $MSE_o$ when the linear equalizer has a finite number of taps. The fade notch in FIG. 7 is centered but in FIG. 8 is offset from the band center. For ease of presenting the results, fad notch offset from the band center is expressed in terms of the ratio of the fade notch distance from the band center to the channel equivalent baseband bandwidth in percentage. In FIG. 8, the fade notch is offset by 69 percent over a 22 MHz channel, that is, an offset of 7.6 MHz from the band center. As observed from FIG. 7, a total of nine taps, including the center tap, are required to achieve the asymptotic matches filter bound when decision feedback taps are present. The same asymptotic performance can be achieved no matter how the nine synchronously spaced taps are deployed between the linear equalizer and the canceler as long as the canceler operates in a decision feedback mode. This is because the equalizer and canceler tap windows complement one another; therefore, since the taps do not overlap, for the same number of taps, the performance remains almost the same in the decision feedback cases. An important configuration is seen when the linear equalizer operates only on the main lobe of CPI by means of its center matrix taps, $M_1 = M_2 = 0$. It is clear that as long as the canceler window is sufficiently wide, a main lobe CPI canceler can achieve the asymptotic matched filter bound. The curves indicate that deep fades degrade the linear equalizer, $N_1 = N_2 = 0$, performance significantly.

Previous studies showed that every 3 dB degradation in $MSE_o$ translates into a loss of 1 bit/sec/Hz of data rate efficiency. Hence, linear equalization may not provide adequate rate efficiency in deep fades.

Figure 10:
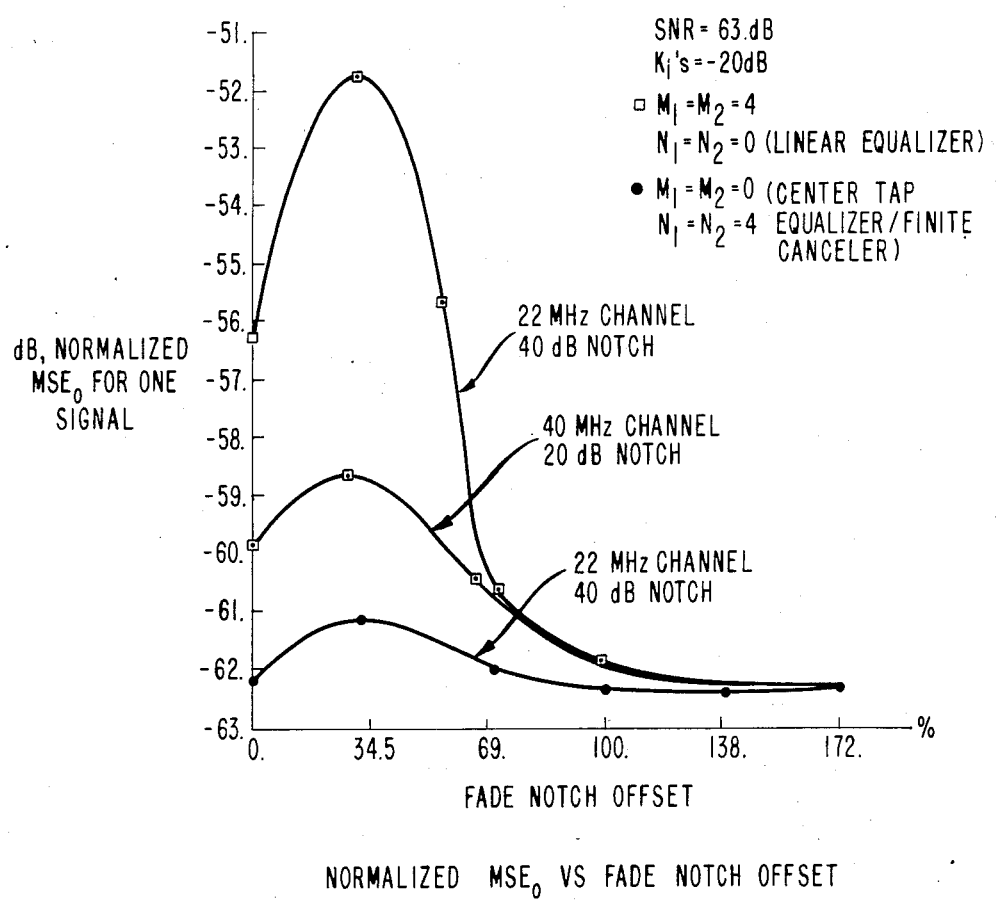

In FIG. 8, similar curves are depicted, as in FIG. 7, but for a 40 dB fade with the notch frequency offset by 69 percent. Improved performance turns out to be due to the particular notch position as will be brought out in the discussion of FIG. 10.

Figure 9:
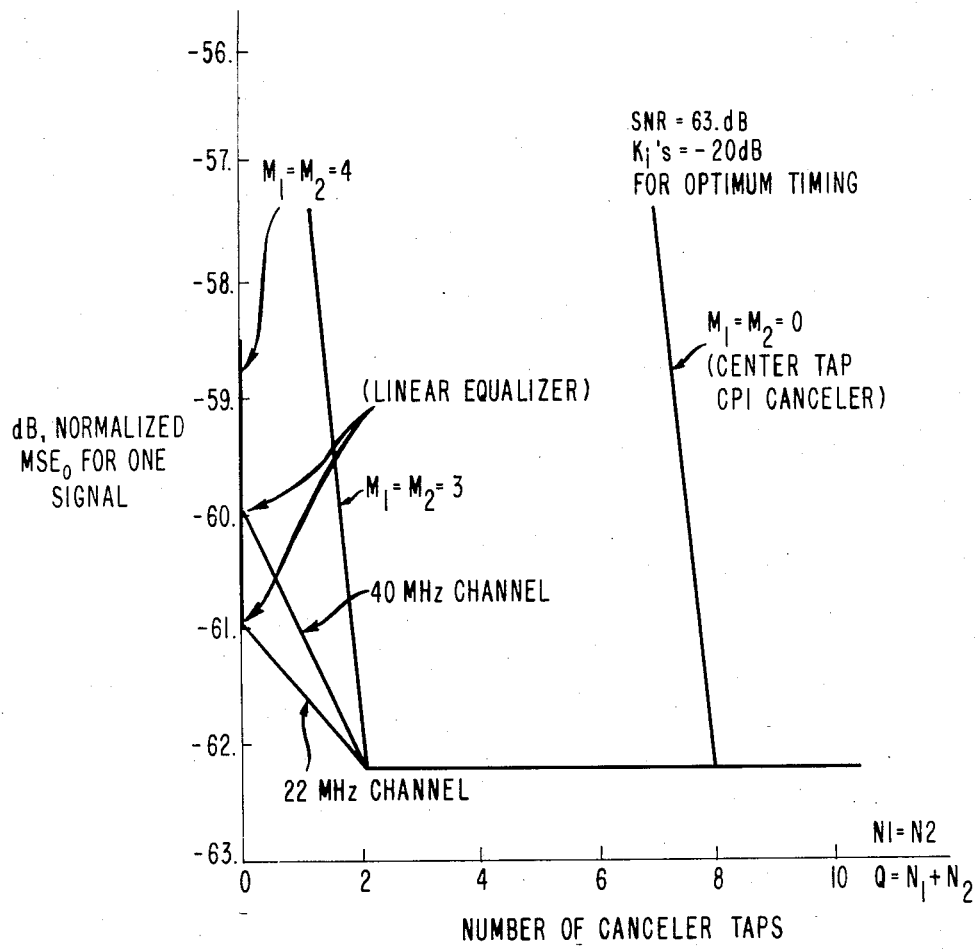

FIG. 9 illustrates a similar set of curves for a 20 dB centered fading of dually polarized signals over both a 22 MHz and a 40 MHz channel. As can be observed, the linear equalizer, $N_1 = N_2 = 0$, performance improves because of the decreased fade depth. Over the wider channel band, however, the degradation over decision feedback is more, as expected. This is due to the wider channel band over which the same fade notch causes more dispersion. The degradation amounts to 2.2 dB loss of $MSE_o$ comparing to matched filter bound, that is, roughly 1 bit/sec/Hz loss of data rate efficiency, and the loss can even be more for offset fades as will be seen in FIG. 10. Hence, even with more typical fades the use of the liner equalizer can be troublesome over a 40 MHz channel.

Figure 11:
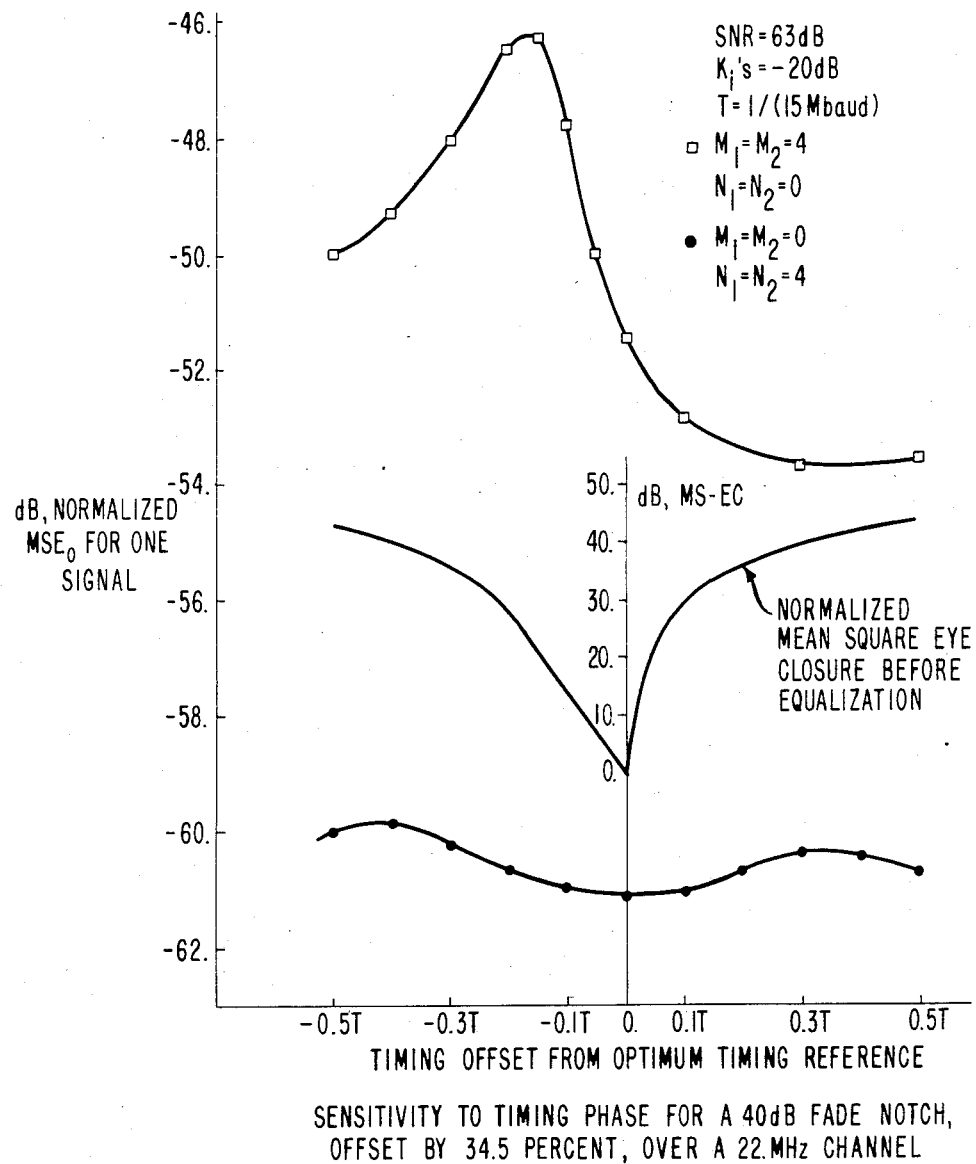

Finally, to compare some of the techniques described earlier in terms of their sensitivity to fade notch offset, the normalized $MSE_o$ is plotted in FIG. 11 as a function of fade notch position, which, as explained hereinbefore, is expressed here in terms of the ratio of the fade notch distance from the band center to the channel equivalent baseband bandwidth. Consider the following structures:

a. A linear equalizer with $M_1 = M_2 = 4$
$N_1 = N_2 0$ (no cancellation)
b. Center tap only linear equalizer/finite window canceler with
$M_1 = M_2 = 0$
$N_1 = N_2 = 4$.

The sensitivity of the linear equalizer to offset fades is quite pronounced. The center tap equalizer with a finite window canceler exhibits a very small sensitivity to offset fades. The degradation of $MSE_o$ for some offset fades can be explained considering the fact that these fades causes cross polarization of the imaginary part of a complex QAM signal into its real part, and for a particular notch offset frequency within the band, the coupling reaches its maximum. Therefore, the $MSE_o$ versus fade notch offset curves exhibit this phenomenon. In dually polarized systems, as in the case of the problem at hand, this is even more pronounced than in single signal transmission, because in the 4×4 system under offset fading there is coupling of three interfering data streams into the fourth one. A decision feedback type canceler structure, by canceling the major contributions to CPI and ISI and with a lesser noise enchancement, exhibits an improved performance compared to the linear equalizer. Note that the curves in FIG. 11 have all been obtained under optimum timing conditions.

Referring to FIG. 11, there is shown a normalized $MSE_o$ superimposed by the normalized MS−EC of the received signal curve before equalization or cancellation as a function of sample timing offset from the optimum timing used to investigate the sensitivity of the two structures to timing phase. This is done for a severe fade, namely, a 40 dB fade with a notch frequency offset by 34.5% over a 22 MHz channel. It is clear that the finite linear equalizer is much more sensitive to timing phase than the decision feedback type. The optimum timing reference is established based on minimizing the MS−EC of the received signal in presence of fading, before CPI and ISI cancellation. Hence, after cancellation occurs, this timing reference may not be the one that minimizes the canceler output $MSE_o$, and indeed the linear equalizer curve of FIG. 11 indicates this fact. The MS−EC curve has a minimum at the optimum timing reference. The sensitivity of the matrix linear equalizer to timing phase can be reduced by applying half-a-baud spaced taps, that is, by deploying fractionally spaced taps. It is to be noted that a decision feedback timing method may prove more robust. But such a method is more complex. The degradation seen in FIG. 11 of the $MSE_o$ is partly attributed to the asymmetric amplitude and delay responses of the fading channel which in the presence of a nonzero roll-off of the shaping filters cause destructive addition of aliases. So, reducing the roll-off of the shaping filters can also improve this situation.

What is claimed is:

1. Apparatus for combined cross polarization interference cancellation and intersymbol interference equalization of signals received over dispersive terrestrial digital radio transmission channels said signals being in dual polarization mode, said apparatus comprising means for obtaining samples of said signals having cross polarization interference and intersymbol interference, means for equalizing said samples, said means for equalizing being adaptively adjusted by first error signals, said means for equalizing comprising a first transversal filter, said first filter being tapped at selected intervals, means for detecting said equalized samples and for deriving output signals, means for deriving said first error signals by comparing said equalized samples with expected samples of said received signals, and means for canceling said cross polarization interference in said samples by receiving said output signals, said canceler means comprising a second transversal filter which is adaptively adjusted by said first error signals, said second transversal filter being tapped at selected intervals, said canceler means generating second error signals and sending said second error signals to means for subtracting said second error signals from said equalized samples, said equalizer taps being at different intervals from said canceler taps.

2. The apparatus of claim 1 wherein said means for obtaining error signals derives the mean square error signal between said expected samples and said detected samples.

3. A method for combined cross polarization interference cancellation and intersymbol interference equalization in dually polarized signals received over a plurality of dispersive terrestrial digital radio transmission channels comprising the steps of (a) obtaining estimates of said signals in each of said channels, (b) equalizing said estimates using a first set of transversal filters which are adaptively adjusted by first error signals, said feedforward transversal filters comprising a plurality of delay taps, (c) decoupling said signals in each of said channels from the signals in all the remaining channels, (d) detecting each of said decoupled signals to generate an output signal for each of said channels, (e) comparing each of said detected signals with an expected signal for obtaining the first error signals, (f) feeding back said first error signals for each of said channels for adaptively and selectively adjusting said first set of transversal filters, (g) canceling the interference in said samples by selectively feeding back said first error signals and said output signals to a second set of transversal filters associated with each channel, said first error signals adaptively adjusting said second set of transversal filters, the output from said second set of transversal filters being subtracted from the output of said decoupled signals, the delay taps of said equalizer and the delay taps of said canceler being taken at selected intervals which do not overlap one another.

4. Apparatus for combined cross-polarization interference and intersymbol interference equalization and cancellation of a dual polarized signal, said apparatus comprising means for equalizing said signal, said means for equalizing comprising a first set of transversal filters having taps at selected intervals, said first set of transversal filters being adaptively adjusted by first error signals, means for receiving said equalized signals from said equalizer means and for deriving output signals, means for comparing said equalized signals with expected signals to derive said first error signals, means for canceling the interference in said signal, said canceler means receiving as its input signals said output signals, said canceler means comprising a second set of transversal filters which are adaptively adjusted by said first error signals, said canceler means deriving second error signals, and means for subtracting said second error signals from said equalized signals.

5. A method for combined cross polarization interference and intersymbol interference equalization and cancellation of a dual polarized signal, said method comprising the steps of equalizing said signal by way of a first set of transversal filters which are adaptively adjusted by first error signals, deriving said first error signals by comparing said equalized signals with expected signals, canceling the interference in said signal by way of a second set of transversal filters which receive as its input said output signals, said second set of transversal filters being adaptively adjusted by the first error signals, said second set of transversal filters generating second error signals, said first and second sets of transversal filters having taps at selected intervals which are different from one another, and subtracting the second error signals from the equalized signals.

* * * * *